United States Patent
Shaughnessy et al.

[11] Patent Number: 6,141,347
[45] Date of Patent: Oct. 31, 2000

[54] WIRELESS COMMUNICATION SYSTEM INCORPORATING MULTICAST ADDRESSING AND METHOD FOR USE

[75] Inventors: Mark Shaughnessy, Algonquin; James E. Mathis, Barrington; Surender Kumar, Schaumburg; Bhavesh G. Patel, Naperville; Mario F. DeRango, Wauconda, all of Ill.

[73] Assignee: Motorola, Inc., Schaumburg, Ill.

[21] Appl. No.: 09/283,121

[22] Filed: Mar. 31, 1999

Related U.S. Application Data

[60] Provisional application No. 60/097,995, Aug. 26, 1998.

[51] Int. Cl.$^7$ ................................................. H04L 12/46
[52] U.S. Cl. ........................................ 370/390; 370/312
[58] Field of Search ..................... 455/518, 519, 455/426, 520; 370/312, 390, 432, 338, 400, 401, 465, 349; 340/825.47

[56] References Cited

U.S. PATENT DOCUMENTS

| | | | |
|---|---|---|---|
| 5,361,256 | 11/1994 | Doeringer et al. | 370/390 |
| 5,387,905 | 2/1995 | Grube et al. | 340/825.52 |
| 5,511,168 | 4/1996 | Perlman et al. | 370/409 |
| 5,517,494 | 5/1996 | Green | 370/408 |
| 5,541,927 | 7/1996 | Kvistol et al. | 370/408 |
| 5,701,300 | 12/1997 | Jean et al. | 370/392 |
| 5,761,193 | 6/1998 | Derango et al. | 370/312 |
| 5,831,975 | 11/1998 | Chen et al. | 370/256 |
| 5,910,946 | 6/1999 | Csapo | 370/328 |
| 5,943,399 | 8/1999 | Bannister et al. | 379/88.17 |

*Primary Examiner*—Douglas W. Olms
*Assistant Examiner*—Ken Vanderpuye
*Attorney, Agent, or Firm*—Susan L. Lukasik

[57] ABSTRACT

A wireless communication system 200 comprises a connectionless packet network 201 coupled to a plurality of sites 203–208 that are in wireless communication with a plurality of subscriber units 210–217 logically arranged into a plurality of talk groups having corresponding talk group identifications. In one embodiment, each site maintains mappings 220–225 of at least one multicast address to at least one talk group identification. In another embodiment, individual subscriber units maintain such mappings 320. When a subscriber unit affiliates with a given site and talk group (501, 601), the site identifies a multicast address corresponding to the talk group. Based on the multicast address, the site can participate in traffic targeted for the multicast address and, consequently, for the talk group. In this manner, mobility Processing is decentralized, system calability is improved and call setup delays are minimized.

21 Claims, 3 Drawing Sheets

— PRIOR ART —

WIRELESS COMMUNICATION SYSTEM INCORPORATING MULTICAST ADDRESSING AND METHOD FOR USE

This application claims the benefit of Provisional No. 60/097,995 filed Aug. 26, 1998.

FIELD OF THE INVENTION

The present invention relates generally to wireless communication systems and, in particular, to a wireless communication system that incorporates multicast addressing.

BACKGROUND OF THE INVENTION

Figure 1:
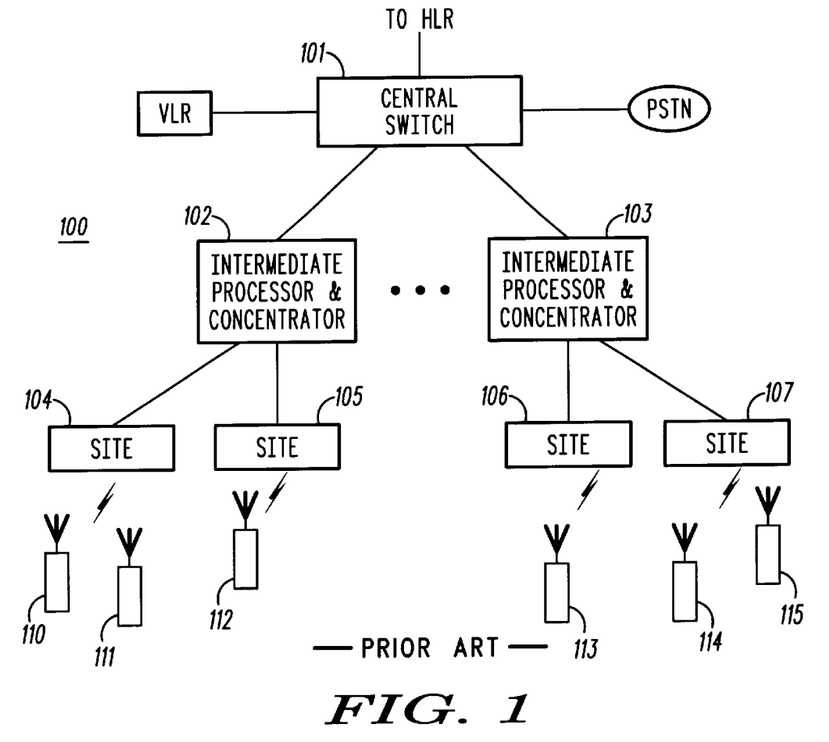
FIG. 1 is a block diagram of a prior art wireless communication system.

Today's wireless communication systems provide a broad range of services to both individual subscriber units and groups of subscriber units while they move about. These services include cellular telephony, group dispatch, and packet data, to name just a few. A typical example of such a system 100 is illustrated in FIG. 1. The configuration shown in FIG. 1 is typical in wireless communications systems such as Global System for Mobile Communications (GSM), Advanced Mobile Phone Service (AMPS), Terrestrial Trunked Radio (TETRA), "IDEN", and "SMARTZONE" systems. As shown, a central switch 101 provides connections between cell sites 104–107. A plurality of subscriber units 110–115 wirelessly communicate with the sites 104–107 and each other, and are often logically divided into various subgroups or talk groups. In such a system, the call processing management and switching functionality are generally contained within the same physical unit, i.e., the central switch 101. The sites 104–107 are connected to the central switch 101 through dedicated or on-demand links and intermediate processors 102–103 in what is often called a "star" configuration. Some very large systems use a hierarchy of such "stars" where intervening concentrators group the links from multiple cell sites and do some lower level processing on them before passing them up to the central switch.

Wireless communication networks as described above typically use a centralized mobility management function. As subscriber units move from one site to another they indicate their movement to the network through handover and location update procedures. The location change information is forwarded to a hierarchical network of location databases, usually called visitor location registers (VLRs) and home location registers (HLRs). The centralized connection management functionality in the switching hub uses this location information to determine which cell sites need to be included when a call request is made. While such configurations and operation generally meet current communication needs, centralized or hierarchical topology suffers from a number of problems.

First, the physical link backhaul required to carry all cell links to a central switching hub can be quite cost prohibitive, especially in cases where the lines are leased. In a typical system, all communications traffic is routed back to the central switch hub. This is particularly problematic when the switch is located far from the cell sites. Furthermore, the extensive resulting network typically needs to be configured at the start of each call. That is, each time a call request is made, network connections must be established before the call can proceed. This adds to otherwise undesirable processing delays.

Current systems also suffer from the risk of a single point of failure. That is, if the central switch itself goes down or is cut off from the network, large amounts of call traffic will be lost, and new call requests cannot be honored. The ability to connect call traffic from cell site to cell site, or cell site to telephone network is greatly impacted. Likewise, in hierarchical mobility databases, the mobility information for all subscribers that are currently located in a given system (which may contain hundreds of cell sites) is typically contained within the VLR associated with the central switch. If the VLR is somehow cut off from the network or fails, or if the HLR cannot be reached, calls to and from subscriber units are impacted and in many cases cannot be connected.

Furthermore, many switch vendors provide expensive equipment in which call processing software and connection processing software are bundled in the switching node itself. Mobility (location) and provisioning (authorization) information are also traditionally tightly bound together. As such, current HLR and VLR databases contain a combination of a subscriber's dynamic location information as well as its relatively more static provisioning parameters. This bundling of functions leads to expensive system solutions that are difficult to scale down.

Therefore, a need exists for a non-hierarchical wireless communication system that decentralizes mobility processing. Such a system should provide easy scalability and should minimize or eliminate network connection processing at call initiation.

DESCRIPTION OF THE PREFERRED EMBODIMENT

The present invention provides a wireless communication system having a non-hierarchical architecture in which mobility processing is distributed, rather than centralized. As a result, system scalability is realized and network connection processing upon call initiation is minimized. In particular, the wireless communication system comprises a connectionless packet network that supports multicast addressing. A plurality of sites are coupled to the connectionless packet network. The sites are in wireless communication with a plurality of subscriber units logically arranged into a plurality of talk groups having corresponding talk group identifications. In one embodiment, each site maintains mappings of at least one multicast address to at least one talk group identification. In another embodiment, individual subscriber units maintain mappings of multicast addresses to talk group identifications. Regardless, when a subscriber unit affiliates with a given site and talk group, that site will identify a multicast address corresponding to the talk group. If another (or second) member of the talk group is not currently operating within the site, the site will request reconfiguration of the connectionless packet network such that the site can participate in traffic targeted for the multicast address and, consequently, for the talk group. When the talk group is no longer active at the site, the site can again request reconfiguration of the connectionless packet network and thereby forego participation in further traffic targeted to the multicast address. In this manner, mobility processing is decentralized and call setup procedures upon call initiation are minimized.

Figure 2:
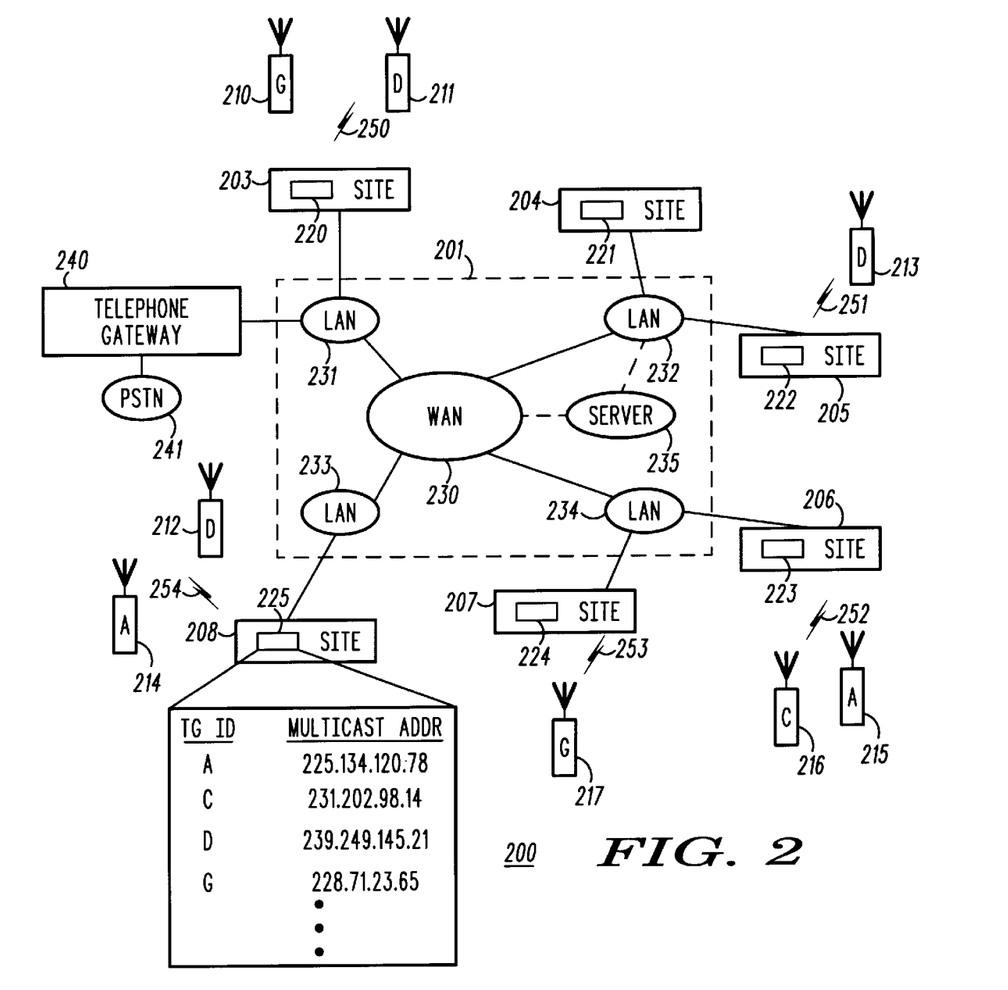
FIG. 2 is a block diagram of a wireless communication system in accordance with the present invention.

The present invention can be more fully described with reference to FIGS. 2–6. FIG. 2 illustrates a wireless communication system 200 comprising a connectionless packet network 201 coupled to a plurality of sites 203–208, which sites are in communication, via wireless communication resources 250–254, with a plurality of subscriber units 210–217. Additionally, the connectionless packet network 201 is coupled to a public switched telephone network (PSTN) 241 via a telephone gateway 240. The plurality of subscriber units 210–217 are logically arranged into a talk groups, which talk groups have corresponding talk group identifications, as known in the art. In FIG. 2, four separate talk groups are shown, identified by labels "A", "C", "D" and "G". Talk group "A" at least includes the subscriber units having reference numerals 214 and 215. Talk group "C" at least includes the subscriber unit having reference numeral 216. Talk group "D" at least includes the subscriber units having reference numerals 211–213. Finally, talk group "G" at least includes the subscriber units having reference numerals 210 and 217. As those having ordinary skill in the art will recognize, any number of talk groups having corresponding talk group identifications can be established within the system 200. Suitable wireless communication resources 250–254 are multiple RF (radio frequency) channels such as pairs of frequency carriers, time division multiplex (TDM) slots, code division multiplex (CDM) channels, or any other RF transmission mediums.

The connectionless packet network 201 comprises a wide area network (WAN) 230 coupled to one or more local area networks (LANs) 231–234. Suitable equipment for establishing the WAN 230 and LANs 231–234 are Cisco 2600 routers, 3640 routers, 7200 routers, 7500 routers, or 3Com "NetBuilder" series routers. The network 201 may also comprise at least one server 235 coupled to either the WAN 230 or one of the LANs 231–234. The network 201 is connectionless in that any data sent across the network from one end point (e.g., a first site) to another (e.g., a second site) does not require a connection to be established between the two end points before the data can be sent. Examples of connectionless protocols that may be used to implement the present invention are Internet Protocol (IP) over Ethernet, or over Point to Point Protocol (PPP), as known in the art.

The connectionless packet network 201 supports at least one multicast address. In the context of the present invention, a multicast address, regardless of any underlying implementation, provides one-to-many or many-to-many communications capability within the network 201. Multipoint routes pertaining to multicast addresses used in the present invention are maintained by the routers forming the network, rather than by a centralized entity. A suitable technique for providing multicast addressing capabilities is through the use of Internet Protocol (IP) Multicast. IP Multicast is based on the well-known Internet Group Management Protocol (IGMP) which allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast—Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, and the Protocol Independent Multicast—Dense Mode (PIM-DM) protocol may also be used to implement the present invention. A common feature of these multicast routing protocols is that each establishes a "spanning tree" which, for a given multicast group, defines all of the router interfaces which contain group members and the necessary routes between these interfaces to provide the multicast distribution with a minimum amount of data replication. Because the spanning tree can be dynamically altered by the routers in the network, the need for a centralized database to track the location of individual group members can be eliminated, as described below.

Figure 3:
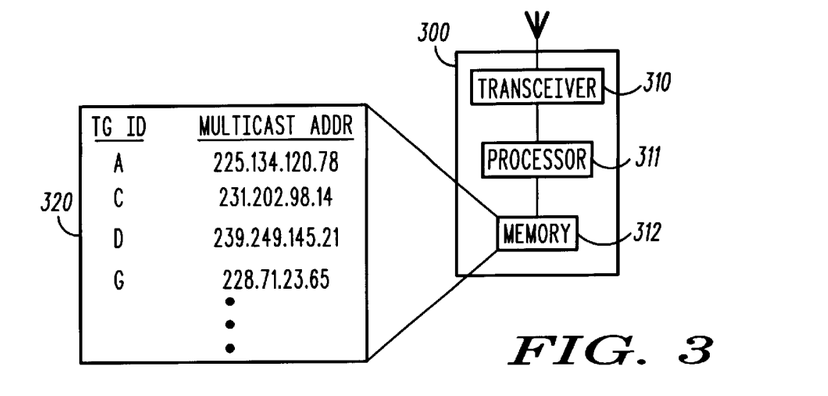
FIG. 3 is a block diagram of a subscriber unit in accordance with the present invention.

In order to harness the mobility management provided by multicast addressing, multicast addresses must be associated with talk group identifications. The present invention anticipates at least two methods for maintaining such associations, as shown in FIGS. 2 and 3. In the first embodiment, each site 203–208 maintains mappings 220–225 of talk group identifications to corresponding multicast addresses. When at least one subscriber unit affiliated with a given talk group affiliates with a site, that site references its stored mappings to determine a multicast address corresponding to the given talk group's identification. Referring to the example in FIG. 2, no subscriber units from any of the representative talk groups are currently affiliated with the site having reference numeral 204. So long as this condition remains, the mappings 221 at that site will not be accessed. In contrast, the site having reference numeral 208 currently has at least one subscriber unit from talk group "A" and at least one subscriber unit from talk group "D" affiliated with that site. (Note that the same physical unit can have multiple talk group affiliations. Thus, a single subscriber unit could lead to multiple talk groups being affiliated with a given site.) Although the multicast addresses for each of talk groups "A", "C", "D" and "G" are stored at the site, only the addresses for talk groups "A" and "D", 225.134.120.78 and 239.249.145.21 respectively, need to be accessed.

In the second embodiment, as shown in FIG. 3, the mappings are stored in each subscriber unit 300. Each subscriber unit (assuming two-way units) comprises a wireless transceiver 310 coupled to a processor 311 which is in turn coupled to memory 312. The wireless transceiver 310 is well known in the art. Likewise, the processor 311 (such as a microprocessor, microcontroller, digital signal processor or combination of such devices) and memory 312 (such as volatile or non-volatile digital storage devices or combination of such devices) are well known. In this embodiment, the mappings 320 of talk group identifications to multicast addresses are stored in the memory 312. In the example shown, the subscriber unit has the mappings for talk group identifications "A", "C", "D" and "G". It is further anticipated that mappings could be stored within the network 201, for example, on a server 235 within the network. Alternatively, the mappings could be stored on an appropriately modified multicast server located within the network 201.

Figure 4:
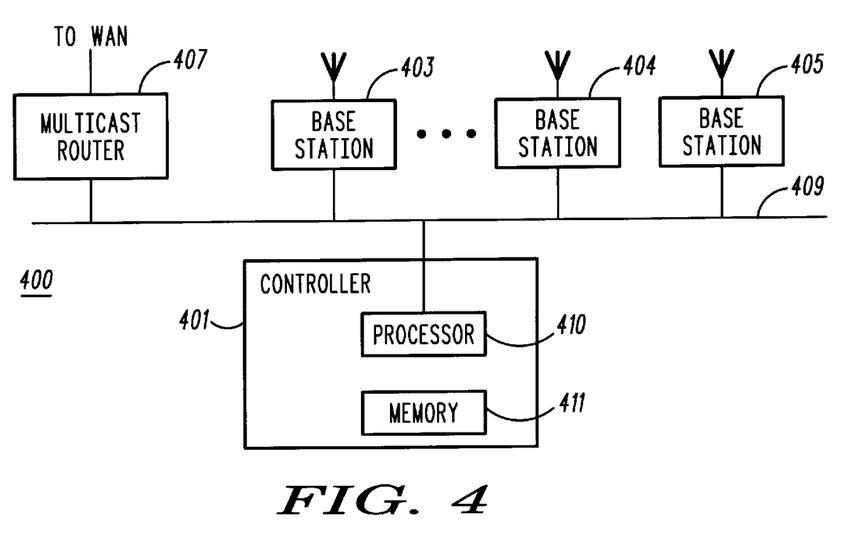
FIG. 4 is a block diagram of a site in accordance with the present invention.

Referring now to FIG. 4, a site 400 is shown comprising a controller 401 and base stations 403–405. The controller 401 and base stations 403–405 are coupled to each other and to a multicast router 407 via a local area network 409. The multicast router 407 and local area network 409 are part of a connectionless packet network, with the multicast router serving as a link between a wide area network and the local area network 409. The controller 401 manages operation of the site 400 in accordance with well known techniques. The controller 401 comprises a processor 410 (such as a microprocessor, microcontroller, digital signal processor or combination of such devices) coupled to memory 411 (such as volatile or non-volatile digital storage devices or combination of such devices). In one embodiment of the present invention, mappings of talk group identifications to multicast addresses are stored in the memory 411. Note that the controller 401 may be physically located in one or more base stations 403–405 or in the multicast router 407, as known in the art.

The base stations 403–405 wirelessly communicate with subscriber units using well-known techniques. The base stations receive affiliation messages from subscriber units wishing to affiliate with the site 400. Identifications of talk groups that a subscriber unit is currently affiliated with can be included in such affiliation messages. These talk group identifications are passed to the controller 401 via the local area network 409 for storage in the memory 411. When the mappings between talk group identifications and multicast addresses are stored in the subscriber units, the base stations also receive multicast addresses from the subscriber units for routing to the controller 401. Further still, when the mappings are stored within the network itself, the controller 401 can access the appropriate point within the network to ascertain the necessary multicast addresses. Regardless of where the mappings between talk group identifications and multicast addresses are maintained, the multicast router 407 controls the flow of all traffic between the site 400 and the packet network based in part upon the multicast addresses. Operation of the site 400 is further described with reference to FIG. 6.

Figure 5:
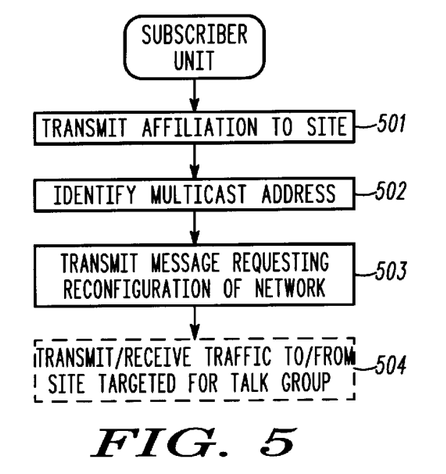
FIG. 5 is a flow chart illustrating operation of a subscriber unit in accordance with the present invention.

Referring now to FIG. 5, a method for use by a subscriber unit is shown. In particular, the method illustrated in FIG. 5 is used when the mappings between talk group identifications and multicast addresses are stored within each subscriber unit, as described above relative to FIG. 3. The steps illustrated in FIG. 5 are preferably implemented, where applicable using stored software routines within the subscriber unit. At step 501, the subscriber unit transmits an affiliation message to a site. This is typically performed whenever a subscriber unit roams between sites or powers-up for the first time within a site. Regardless, the affiliation message includes at least one talk group identification, as known in the art, corresponding to at least one talk group with which the subscriber unit is currently affiliated.

At step 502, the subscriber unit accesses its stored mappings to identify at least one multicast address uniquely associated with the at least one talk group identification. Referring to the example illustrated in FIG. 3, assume that the subscriber unit 300 is currently only affiliated with talk group "C". After having transmitted the affiliation message comprising the identification of talk group "C" to the site, the subscriber unit 300, via the processor 311, accesses the memory 312 to identify the multicast address uniquely associated with talk group "C". In this case, it would retrieve the multicast address 231.202.98.14.

At step 503, the subscriber unit transmits to the site a message, comprising the multicast address, requesting reconfiguration of the packet network coupled to the site. The message may be in encapsulated form such that the site, upon receiving the message, simply strips off any unnecessary information and send the reconfiguration request directly to the multicast router, if necessary. Alternatively, the message may simply instruct the site (via the controller) to formulate the required reconfiguration request. The conditions defining when the site actually submits the reconfiguration request are discussed in further detail with reference to FIG. 6 below. When IP Multicasting techniques are used, reconfiguration requests instigated by subscriber unit affiliations take the form of IGMP Membership Report or "join" messages which cause the packet network to re-define the spanning tree routes for that multicast address. Once reconfigured, the packet network ensures that the site will be able to participate in traffic targeted for the desired multicast address or addresses. It is understood that the above described steps could be rearranged and consolidated to achieve the same results. That is, both the talk group identification and the multicast address could be included in the affiliation message. In that case, step 502 would be performed first, followed by step 501. Step 503 would not be necessary as a result. Those having ordinary skill in the art will recognize that other schemes based on mappings stored in the subscriber unit and achieving the same result could be developed.

At step 504, having caused the network to be reconfigured (or reestablish the multicast routes), the subscriber unit may optionally participate in traffic targeted for the talk group via the multicast address. That is, based on the talk group identification, the subscriber unit can transmit voice or data information to the site. Likewise, the subscriber unit can receive voice or data information from the site based on the talk group identification. Because the site has knowledge of which talk groups are represented within its coverage area, it can transmit and receive traffic via the multicast addresses and ensure that the proper talk group participants are involved. Operation of the site is discussed in further detail with reference to FIG. 6.

Figure 6:
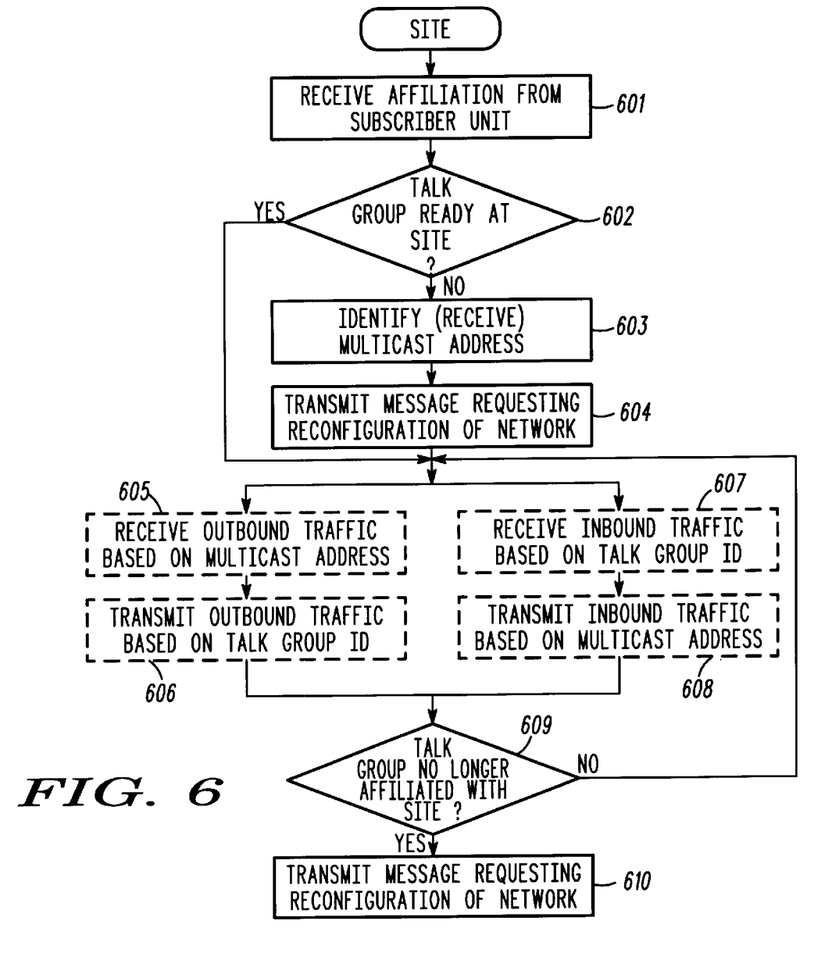
FIG. 6 is a flow chart illustrating operation of a site in accordance with the present invention.

In the preferred embodiment, the steps illustrated in FIG. 6, where applicable, are implemented as software routines executed by a site controller, base stations or any other elements contributing to the operation of a site, including the multicast router 407. At step 601, the site receives an affiliation message, via a base station, from a subscriber unit. The affiliation message includes at least one talk group identification indicating that the subscriber unit is currently affiliated with one or more talk groups. As described above relative to FIG. 5, the site may also receive at least one multicast address uniquely associated with each of the at least one talk group identifications. If received from the subscriber unit, the at least one multicast address can be included in the affiliation message or in subsequent control messages.

At step 602, the site determines whether the talk groups corresponding to the at least one talk group identification are already represented at the site. That is, the site, preferably within the controller, maintains a database of all subscriber units currently affiliated with the site and their respective talk group affiliations and multicast addresses. If at least one subscriber unit affiliated with a given talk group is currently affiliated with the site, then that talk group is considered to be represented at the site. If a given talk group is already represented at the site, then the required multicast address has already been identified and the network properly reconfigured. As such, the process proceeds to steps 605–610.

However, if the subscriber unit that sent the affiliation at step 601 is currently the only subscriber unit at the site having an affiliation with a given talk group, then the process proceeds to step 603. At step 603, the site identifies a multicast address corresponding to the talk groups indicated in the affiliation message. The present invention contemplates at least two methods for identifying the multicast address. Where subscriber units maintain a mapping of talk group identifications to multicast addresses, as discussed above, step 603 consists of the site receiving the appropriate multicast address from the subscriber unit that sent the affiliation message. Where the sites maintain such mappings, the identification is performed by accessing the mappings stored within the site (preferably within the controller) according to the received talk group identification and retrieving the corresponding multicast address. Further still, the mappings can be maintained within the connectionless network itself, as described above, with the site accessing a point within the network (such as a server) to obtain the multicast address. Regardless of where they are maintained, the mappings can be periodically updated to reflect the creation of new talk groups or the modification/deletion of existing talk groups.

Once the proper multicast address has been identified, the site transmits a message to the packet network requesting reconfiguration of the packet network such that the site can participate in traffic associated with the multicast address identified at step 604. In those instances where the subscriber unit supplies the multicast address to the site, step 604 may proceed in accordance with step 503, discussed above. That is, the reconfiguration request may be received directly from the subscriber unit and simply passed on by the site to the network, or the site can generate the reconfiguration request responsive to the multicast address received from the subscriber unit. The reconfiguration request made at step 604 cause the spanning tree associated with the multicast address to be re-defined to include the multicast router for the site.

Having reconfigured the network such that the site may participate in traffic identified by the multicast address, the site simultaneously or alternatively executes steps 605–606 and steps 607–608. At step 605, the site receives outbound (from the infrastructure to the subscriber units) voice or data traffic based on the multicast address from the multicast router servicing that site. The processes whereby a multicast router filters for traffic associated with a given multicast address are well-understood in the art. Based on the multicast address used to receive the traffic, the site (via the controller) determines which talk group identification is associated with that multicast address using the database described at step 602. Based on the talk group identification, the site (via the base stations) transmits the outbound voice or data traffic at step 606. Because the talk group identification is included in the transmitted voice or data traffic, subscriber units affiliated with the talk group will process the received traffic for presentation to subscriber users. Alternatively, when the subscriber unit performs the mapping, the transmitted voice or data traffic may be addressed using the multicast address directly.

The reverse process, i.e., for inbound (from the subscriber units to the infrastructure) voice or data traffic, can be simultaneously or alternatively performed at steps 607–608. At step 607, the site (via the base stations) receives, from a subscriber unit, inbound voice or data traffic that includes the talk group identification, as known in the art. Again using the database described at step 602, the site determines which multicast address is associated with the talk group identification included in the inbound traffic. The inbound traffic, along with the multicast address, is sent to the multicast router coupled to the site which in turn transmits, at step 608, the inbound traffic in accordance with the spanning tree associated with the multicast address. Because the spanning tree defines the most efficient routing within the network, those sites having members of the talk group currently operating within their coverage areas will receive the inbound traffic in an efficient manner without the need for a centralized mobility database. Furthermore, because the packet network is connectionless, and because the required multicast addresses are determined by the sites during mobility events (i.e., affiliation), the delays introduced by call setup in prior art systems are substantially reduced. That is, as soon as traffic for a given talk group is received at a site, either from a subscriber unit or from the network, it can be very quickly routed based on the multicast addresses and talk group identifications, rather than waiting for connections to be established between sites prior to the reception or transmission of traffic.

So long as at least one subscriber unit affiliated with the talk group remains operational within the site, processing continues at steps 605–608 as described above. However, at step 609, the site can determine that the talk group is no longer affiliated with the site. At least three methods may be used to determine when a talk group is no longer affiliated with the site.

In the first method, the site transmits paging messages to those subscriber units affiliated with the site and the talk group. If all of the paged subscriber units fail to respond with an acknowledgment to the page, then it is assumed that the talk group is no longer represented at the site.

In the second method, the site receives a message from an other site indicating that a given subscriber unit has left the site and now affiliated with the other site. Accessing a database as describe above at step 602, the site determines if the given subscriber unit was that last subscriber unit affiliated with the talk group at the site, i.e., if any other subscriber unit affiliated with the talk group is currently affiliated with the site. If the given subscriber unit was the last subscriber unit affiliated with the talk group and the site, it is again assumed that the talk group is no longer represented at the site.

In the third method, similar to the second method, the site receives a message from an other site comprising a last interaction time stamp. The last interaction time stamp indicates a time when the other site last interacted with a given subscriber unit, i.e., when the other site at least received information of any sort from the given subscriber unit. The site then compares the last interaction time stamp with a time stamp indicating when the site last interacted with the subscriber unit. Given a common time base for both time stamps, the site assumes that the given subscriber unit is no longer affiliated with the site if the last interaction time stamp for the other site is substantially more recent than the time stamp for the site. If the given subscriber unit was the last subscriber unit affiliated with the talk group and the site, it is again assumed that the talk group is no longer represented at the site.

Regardless of the method used, if the talk group is no longer affiliated with (represented at) the site, then the site transmits a message at step 610 requesting reconfiguration of the network such that the site will not be able to participate in subsequent traffic associated with the talk group's multicast address. When IP Multicasting techniques are used, reconfiguration requests sent at step 610 take the form of "leave" messages which cause the packet network to re-define the spanning tree for that multicast address excluding the multicast router for the site. Once the network has been reconfigured, the site will no longer receive traffic associated with the multicast address. This is useful for not filling the links to the site with unnecessary traffic.

The present invention provides a wireless communication system having a non-hierarchical architecture in which mobility processing is distributed, rather than centralized. Based on multicast addressing and routing in a connectionless packet network, the mobility information is inherent to the packet network. Sites needing to receive traffic for a given talk group may request reconfiguration of the packet network in order to participate in traffic for that talk group. This is achieved using a mapping between talk group identifications and multicast addresses, which mapping may be maintained at various points throughout the wireless communication system. Without the centralized mobility processing, the wireless communication system is more resistant to single points of failure. Additionally, given the non-hierarchical nature of the connectionless packet network, the wireless communication system is more easily scaled.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A wireless communication system that includes a plurality of subscriber units arranged into a plurality of talk groups, wherein each of the plurality of talk groups is identified by a corresponding talk group identification, the wireless communication system comprising:

a connectionless packet network that supports at least one multicast address; and a plurality of sites, operably coupled to the connectionless packet network, that provides wireless communications with the plurality of subscriber units, and that each maintains a mapping of at least one talk group identification to the at least one multicast address.

2. The wireless communication system of claim 1, the connectionless packet network further comprising:

a wide area network; and at least one local area network coupled to the wide area network, wherein the at least one local area network is coupled to at least one site of the plurality of sites.

3. The wireless communication system of claim 2, the at least one site of the plurality of sites further comprising a telephone gateway coupled to the connectionless packet network and to a public switched telephone network.

4. The wireless communication system of claim 2, the connectionless packet network further comprising at least one multicast IP router coupled to the wide area network and the at least one local area network.

5. A subscriber unit for use in a wireless communication system comprising a plurality of sites linked together by a packet network and a plurality of subscriber units arranged into talk groups having corresponding talk group identifications, the subscriber unit further comprising:

a transceiver that wirelessly communicates with the plurality of sites;

a processor, coupled to the transceiver; and means, coupled to the processor, for maintaining a mapping of at least one talk group identification to at least one multicast address, wherein the packet network supports the at least one multicast address.

6. A site for use in a wireless communication system comprising a plurality of sites linked together by a packet network and a plurality of subscriber units arranged into talk groups having corresponding talk group identifications, the site further comprising:

at least one base station that wirelessly communicates with the plurality of subscriber units;

a controller, coupled to the at least one base station, comprising means for maintaining a mapping of at least one talk group identification to at least one multicast address, wherein the packet network supports the at least one multicast address.

7. The site of claim 6, further comprising:

means, coupled to the means for maintaining the mapping, for identifying a multicast address corresponding to a talk group identification received via the at least one base station from a subscriber unit; and means, coupled to the means for identifying the multicast address, for transmitting, to the packet network, a message comprising the multicast address requesting reconfiguration of the packet network such that the site at least receives outbound traffic identified by the multicast address.

8. The site of claim 7, further comprising means, coupled to the means for identifying, for transmitting, to the packet network, a message comprising the multicast address requesting reconfiguration of the packet network such that the site does not subsequently receive outbound traffic identified by the multicast address.

9. In a wireless communication system comprising a plurality of sites and a plurality of subscriber units arranged into a plurality of talk groups, the plurality of sites linked together by a packet network, a method comprising the steps of:

transmitting, to a site of the plurality of sites, an affiliation message comprising a talk group identification corresponding to a talk group of the plurality of talk groups;

identifying a multicast address corresponding to the talk group identification; and transmitting to the site, a message, comprising the multicast address that causes the site to request reconfiguration of the packet network and consequently at least receive outbound traffic identified by the multicast address.

10. The method of claim 9, further comprising the step of receiving, from the site, traffic targeted to the talk group.

11. The method of claim 9, further comprising the step of transmitting, to the site, traffic targeted to the talk group.

12. In a wireless communication system comprising a plurality of sites and a plurality of subscriber units arranged into a plurality of talk groups, the plurality of sites linked together by a packet network, a method for a site of the plurality of sites to register a subscriber unit of the plurality of subscriber units with a talk group of the plurality of talk groups, the method comprising the steps of:

receiving, from the subscriber unit, an affiliation message comprising a talk group identification corresponding to the talk group;

identifying a multicast address corresponding to the talk group identification; and transmitting, to the packet network, a message comprising the multicast address requesting reconfiguration of the packet network such that the site at least receives outbound traffic identified by the multicast address.

13. The method of claim 12, wherein the step of identifying further comprises receiving the multicast address from the subscriber unit.

14. The method of claim 12, wherein the steps of identifying the multicast address and transmitting the message to the packet network are performed only when the talk group corresponding to the talk group identification is not currently affiliated with the site.

15. The method of claim 12, further comprising the steps of:

receiving, from the packet network, the outbound traffic identified by the multicast address and targeted to the talk group; and transmitting the outbound traffic to the subscriber unit based on the talk group identification.

16. The method of claim 12, further comprising the steps of:

receiving inbound traffic identified by the talk group identification and targeted to the talk group from the subscriber unit based on the talk group identification; and transmitting the inbound traffic to the packet network based on the multicast address.

17. The method of claim 12, further comprising the steps of:

determining that the talk group corresponding to the talk group identification is no longer affiliated with the site; and transmitting, to the packet network, a message comprising the multicast address requesting reconfiguration of the packet network such that the site does not subsequently receive outbound traffic identified by the multicast address.

18. The method of claim 17, the step of determining further comprising the steps of:

sending pages to subscriber units of the plurality of subscriber units currently affiliated with the site and the talk group; and determining that the talk group is no longer affiliated with the site when no acknowledgments from the subscriber units are received in response to the pages.

19. The method of claim 17, the step of determining further comprising the steps of:

receiving, from an other site of the plurality of sites, a message indicating that a selected subscriber unit of the plurality of subscriber units has left the site and affiliated with the other site; and determining that the talk group is no longer affiliated with the site when the selected subscriber unit was a last subscriber unit affiliated with the site and the talk group.

20. The method of claim 17, the step of determining further comprising the steps of:

receiving, from an other site of the plurality of sites, a message comprising a last interaction time stamp corresponding to a selected subscriber unit of the plurality of subscriber units, wherein the last interaction time stamp indicates when the other site last communicated with the selected subscriber unit;

comparing the last interaction time stamp with a time stamp indicating when the site last communicated with the selected subscriber unit; and determining that the talk group is no longer affiliated with the site when the selected subscriber unit was a last subscriber unit affiliated with the site and the talk group, and when the last interaction time stamp is substantially more recent than the time stamp indicating when the site last communicated with the selected subscriber unit.

21. A communication system comprising:

a connectionless packet network that supports at least one multicast address;

a plurality of sites, operably coupled to the connectionless packet network, arranged and constructed to provide wireless communications with a plurality of subscriber units that are arranged in a plurality of talkgroups each having a corresponding talkgroup identification and such that each site maintains a mapping of at least one talkgroup identification to the at least one multicast address; and at least one site controller, operably coupled to the connectionless packet network, arranged and constructed to reconfigure the connectionless packet network to at least receive outbound traffic identified by the at least one multicast address.

* * * * *

UNITED STATES PATENT AND TRADEMARK OFFICE
CERTIFICATE OF CORRECTION

PATENT NO. : 6,141,347
DATED : October 31, 2000
INVENTOR(S) : Shaughnessy, et al.

It is certified that error appears in the above-identified patent and that said Letters Patent is hereby corrected as shown below:

<u>Title page,</u>
Item [57], in the abstract, "Processing" should be -- processing -- and "calability" should be -- scalability --

Signed and Sealed this

Second Day of October, 2001

*Attest:*

*Nicholas P. Godici*

NICHOLAS P. GODICI
*Attesting Officer*   *Acting Director of the United States Patent and Trademark Office*